United States Patent
Kim et al.

(10) Patent No.: US 12,452,882 B2
(45) Date of Patent: Oct. 21, 2025

(54) BS APPARATUS, UE APPARATUS, AND DCI CONTROL METHOD PERFORMED BY EACH DEVICE

(71) Applicant: SK TELECOM CO., LTD., Seoul (KR)

(72) Inventors: Kang Ho Kim, Seoul (KR); Min Soo Na, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 402 days.

(21) Appl. No.: 18/085,506

(22) Filed: Dec. 20, 2022

(65) Prior Publication Data

US 2024/0008053 A1 Jan. 4, 2024

(30) Foreign Application Priority Data

Jun. 29, 2022 (KR) .................... 10-2022-0079650

(51) Int. Cl.
*H04W 72/23* (2023.01)
*H04W 72/232* (2023.01)

(52) U.S. Cl.
CPC ................. *H04W 72/232* (2023.01)

(58) Field of Classification Search
CPC .................................................. H04W 72/232
See application file for complete search history.

(56) References Cited

U.S. PATENT DOCUMENTS

2019/0387507 A1* 12/2019 Takeda .............. H04W 28/06

FOREIGN PATENT DOCUMENTS

| JP | 2019-518366 A | 6/2019 |
| JP | 2019-220947 A | 12/2019 |
| JP | 2022-531715 A | 7/2022 |
| WO | 2020/223960 A1 | 11/2020 |

OTHER PUBLICATIONS

Office Action dated Nov. 19, 2024 for corresponding Japanese Patent Application No. 2023-168976, along with an English translation (4 pages).
Notice of Allowance (Decision to Grant) issued on Sep. 1, 2023, for corresponding Japanese Patent Application No. 2022-194758, along with an English machine translation (3 pages).
Office Action dated Aug. 1, 2024 for corresponding Japanese Patent Application No. 2023-168976, along with an English translation (7 pages).
Office Action issued on Feb. 5, 2025 for corresponding Korean Patent Application No. 10-2022-0079650 along with an English translation (9 pages).
Samsung, "Procedure for Two-step RACH", R1-1910454, 3GPP TSG RAN WG1 #98bis, Chongqing, China, Oct. 14-20, 2019, (8 pages).

* cited by examiner

*Primary Examiner* — Ronald B Abelson
(74) *Attorney, Agent, or Firm* — Hauptman Ham, LLP

(57) ABSTRACT

The disclosure proposes an apparatus and a method capable of minimizing the size of DCI and transmitting the DCI containing as much information as through a scheme of converting some information (the bit value to be converted) of the DCI into location information (scheduling location) of the PDCCH to transmit the same.

11 Claims, 8 Drawing Sheets

FIG. 1

| Field (Item) | Bits |
|---|---|
| Identifier for DCI formats | 1 |
| Frequency domain resource assignment | Variable |
| Time domain resource assignment | 4 |
| VRB-to-PRB mapping | 1 |
| Modulation and coding scheme | 5 |
| New data indicator | 1 |
| Redundancy version | 2 |
| HARQ process number | 4 |
| Downlink assignment index | 2 |
| TPC command for scheduled PUCCH | 2 |
| PUCCH resource indicator | 3 |
| PDSCH-to-HARQ_feedback timing indicator | 3 |

FIG. 4

```
pdcch-ConfigCommon: setup (1)
  setup
    commonControlResourceSet
      controlResourceSetId: 1
      frequencyDomainResources: 1001 1111 1111 1111 1111 1111 ...
      locationToDciConversionInfo:
        00000,
        001011,
        011010,
        11000,
        000110,
        01110,
        110011,
        111,
        01110,
        1111,
        ...
      duration: 1
      cce-REG-MappingType: nonInterleaved (1)
        nonInterleaved: NULL
      precoderGranularity: sameAsREG-bundle (0)
    commonSearchSpaceList: 1 item
      Item 0
        SearchSpace
          searchSpaceId: 1
          controlResourceSetId: 1
          monitoringSlotPeriodicityAndOffset: sl1 (0)
            sl1: NULL
          monitoringSymbolsWithinSlot: 8000
          nrofCandidates
            aggregationLevel1: n0 (0)
            aggregationLevel2: n0 (0)
            aggregationLevel4: n0 (0)
            aggregationLevel8: n5 (5)
            aggregationLevel16: n0 (0)
          searchSpaceType: common (0)
            common
              dci-Format0-0-AndFormat1-0
    ra-SearchSpace: 1
```

| RB Offset | Location to DCI bits |
|---|---|
| ... | ... |
| 66 | 1111 |
| 60 | 01110 |
| 54 | 111 |
| 48 | 110011 |
| 42 | 01110 |
| 36 | 000110 |
| 30 | 11000 |
| 24 | 010010 |
| 18 | 0001011 |
| 12 | - |
| 6 | - |
| 0 | 00000 |

FIG. 5

```
pdcch-ConfigCommon: setup(1)
setup
  commonControlResourceSet
    controlResourceSetId: 1
    frequencyDomainResources: 1111 1111 1111 1111 1111 1111 ...
    frequencyLocationToDciInfo: 1111 0000 1010 0011 1000 0000 ...
    duration: 1
    cce-REG-MappingType: nonInterleaved (1)
      nonInterleaved: NULL
    precoderGranularity: sameAsREG-bundle (0)
  commonSearchSpaceList: 1 item
    Item 0
      SearchSpace
        searchSpaceId: 1
        controlResourceSetId: 1
        monitoringSlotPeriodicityAndOffset: sl1 (0)
          sl1: NULL
        monitoringSymbolsWithinSlot: 8000
        nrofCandidates
          aggregationLevel1: n0 (0)
          aggregationLevel2: n0 (0)
          aggregationLevel4: n0 (0)
          aggregationLevel8: n5 (5)
          aggregationLevel16: n0 (0)
        searchSpaceType: common (0)
          common
            dci-Format0-0-AndFormat1-0
  ra-SearchSpace: 1
```

| RB Offset | frequencyLocationToDciInfo | whether location of PDCCH is associated with DCI information |
|---|---|---|
| ... | ... | ... |
| 138 | 0 | X |
| 132 | 0 | X |
| 126 | 0 | X |
| 120 | 0 | X |
| 114 | 0 | X |
| 108 | 0 | X |
| 102 | 0 | X |
| 96 | 1 | O |
| 90 | 1 | O |
| 84 | 1 | O |
| 78 | 0 | X |
| 72 | 0 | X |
| 66 | 0 | X |
| 60 | 1 | O |
| 54 | 0 | X |
| 48 | 1 | O |
| 42 | 0 | X |
| 36 | 0 | X |
| 30 | 0 | X |
| 24 | 0 | X |
| 18 | 1 | O |
| 12 | 1 | O |
| 6 | 1 | O |
| 0 | 1 | O |

FIG. 6

```
pdcch-ConfigCommon: setup (1)
  setup
    commonControlResourceSet
      controlResourceSetId: 1
      frequencyDomainResources: 1111 1111 1111 1111 1111 1111 ...
      frequencyLocationToDciInfo: 1001 1100 1010 0011 1000 0000 ...
      locationToDciConvergingInfo:
        00000,
        001011,
        011010,
        11000,
        000110,
        01110,
        110011,
        111,
        01110,
        1111,
        ...
      duration: 1
      cce-REG-MappingType: nonInterleaved (1)
        nonInterleaved: NULL
      precoderGranularity: sameAsREG-bundle (0)
    commonSearchSpaceList: 1 item
      Item 0
        SearchSpace
          searchSpaceId: 1
          controlResourceSetId: 1
          monitoringSlotPeriodicityAndOffset: sl1 (0)
            sl1: NULL
          monitoringSymbolsWithinSlot: 8000
          nrofCandidates
            aggregationLevel1: n0 (0)
            aggregationLevel2: n0 (0)
            aggregationLevel4: n0 (0)
            aggregationLevel8: n5 (5)
            aggregationLevel16: n0 (0)
          searchSpaceType: common (0)
            common
              dci-Format0-0-AndFormat1-0
    ra-SearchSpace: 1
```

| RB Offset | FrequencyLocationToDcInfo | whether location of PDCCH is associated with DCI information | Location to DCI bits |
|---|---|---|---|
| 138 | 0 | X | - |
| 132 | 0 | X | - |
| 126 | 0 | X | - |
| 120 | 0 | X | - |
| 114 | 0 | X | - |
| 108 | 0 | X | - |
| 102 | 0 | X | - |
| 96 | 1 | O | 01110 |
| 90 | 1 | O | 111 |
| 84 | 1 | O | 110011 |
| 78 | 0 | X | - |
| 72 | 0 | X | - |
| 66 | 0 | X | - |
| 60 | 1 | O | 01110 |
| 54 | 0 | X | - |
| 48 | 1 | O | 000110 |
| 42 | 0 | X | - |
| 36 | 0 | X | - |
| 30 | 1 | O | 11000 |
| 24 | 0 | O | 010010 |
| 18 | 1 | O | 000011 |
| 12 | 0 | X | - |
| 6 | 0 | X | - |
| 0 | 1 | O | 00000 |

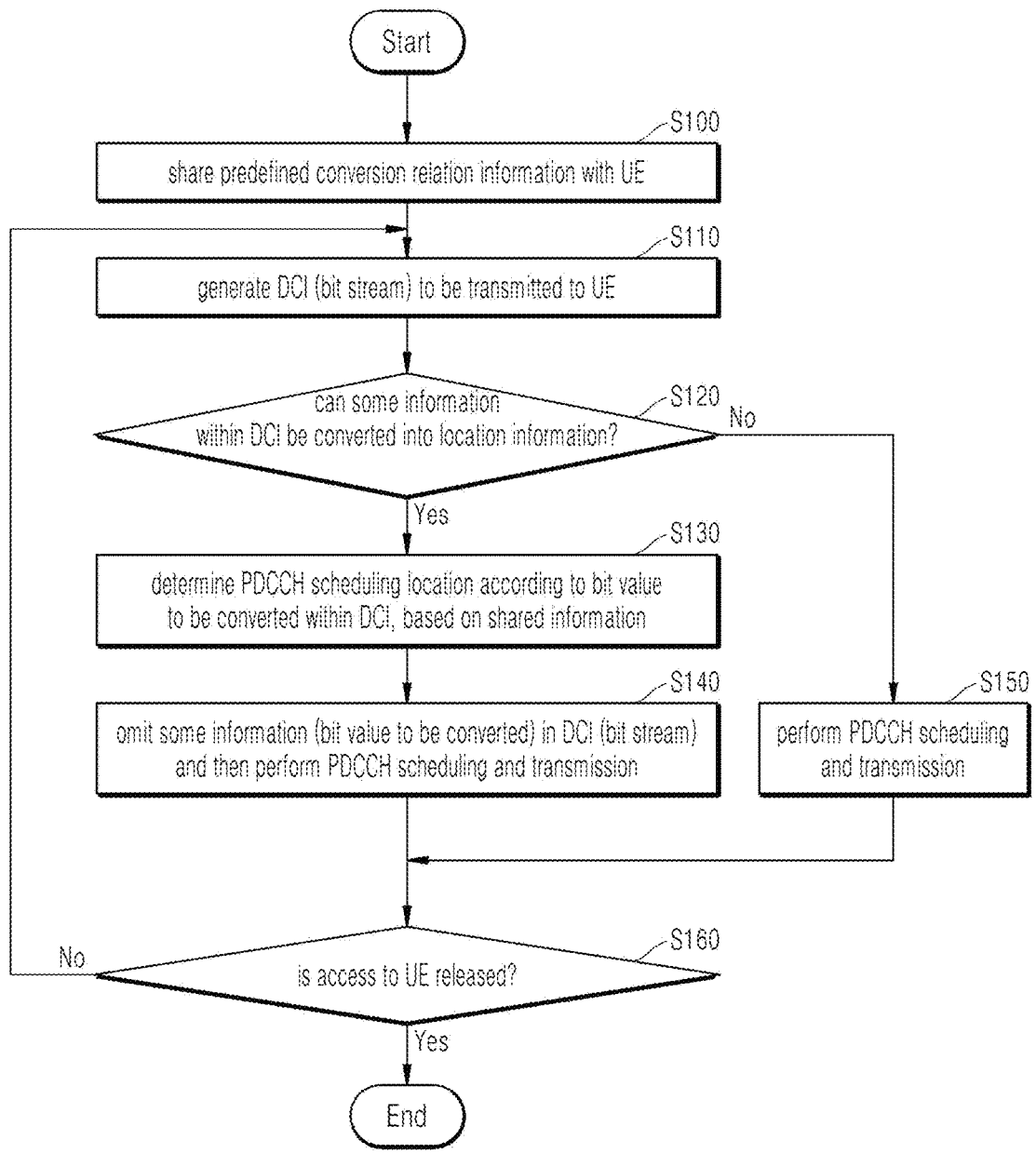

BS APPARATUS, UE APPARATUS, AND DCI CONTROL METHOD PERFORMED BY EACH DEVICE

CROSS-REFERENCE TO RELATED APPLICATION(S)

The instant application is based on and claims priority to Korean Patent Application No. 10-2022-0079650, filed on Jun. 29, 2022. The disclosure of above-listed application is incorporated by reference herein in its entirety.

BACKGROUND OF THE INVENTION

1. Field of the Invention

The disclosure relates to a technology for controlling the size of downlink control information (DCI) and transmitting the DCI.

2. Description of the Prior Art

A physical downlink control channel (PDCCH) is a control channel and is used to transmit scheduling information for a physical downlink shared channel (PDSCH) or a scheduling grant for a physical uplink shared channel (PUSCH).

The information transmitted using the PDCCH may be generated and transmitted according to a downlink control information (DCI) format defined in the standard.

For the DCI, various types of formats are defined according to the use thereof.

The PDCCH used to transmit the DCI is an important channel containing control information, and thus stable transmission thereof is very important.

Accordingly, the DCI transmitted using the PDCCH is required to be designed to contain as much information as possible with a minimum size. This is because the DCI can be further preserved and transmitted using the PDCCH as the size of the DCI is smaller.

In conventional art, a base station (BS) generates several profiles and transmits the same to a user equipment (UE) in advance through an RRC message, and only the indexes of the profiles is transmitted through DCI, thereby minimizing the DCI size.

However, when there is much information to be transmitted to the UE through the DCI, the number of indexes that should be transmitted increases, and thus the conventional art has a limitation in minimizing the DCI size sufficiently.

Therefore, the disclosure proposes a method of minimizing the DCI size and inserting as much information as possible into the DCI to transmit the same.

SUMMARY OF THE INVENTION

An aspect of the disclosure is to propose and realize a new type of DCI transmission technology capable of minimizing the size of DCI and transmitting the DCI containing as much information as possible.

In accordance with an aspect of an embodiment of the disclosure, a BS apparatus includes: a determination unit configured to determine specific information for converting some of all pieces of information of downlink control information (DCI) to be transmitted to a UE; and a controller configured to omit some information in the DCI, transmit the DCI without some information, based on the determined specific information, acquire some information from the specific information detected during a process in which the UE receives the DCI without some information, and acquire the DCI including the all pieces of information.

In accordance with another aspect of an embodiment of the disclosure, a UE apparatus includes: an information acquisition unit configured to acquire some information omitted in DCI from specific information detected when the downlink control information (DCI) without some information is received; and a controller configured to acquire DCI including all pieces of information based on the acquired some information.

In accordance with another aspect of an embodiment of the disclosure, a method of controlling downlink control information (DCI) performed by a BS apparatus includes: determining specific information for converting some of all pieces of information of DCI to be transmitted to a UE; and omitting some information in the DCI, transmitting the DCI without some information, based on the determined specific information, acquiring some information from the specific information detected during a process in which the UE receives the DCI without some information, and acquiring the DCI including the all pieces of information.

In accordance with another aspect of an embodiment of the disclosure, a method of controlling downlink control information (DCI) performed by a UE apparatus includes: acquiring some information omitted in DCI from specific information detected when the DCI without some information is received; and acquiring DCI including all pieces of information based on acquired some information.

According to the BS apparatus and the UE apparatus of the disclosure, and the method of controlling DCI performed by each apparatus, it is possible to minimize the size of DCI and transmit the DCI containing as much information as possible, thereby preserving PDCCH resources and using bit resources saved through the minimization of the DCI size for another purpose.

BRIEF DESCRIPTION OF THE DRAWINGS

The above and other aspects, features, and advantages of the present disclosure will be more apparent from the following detailed description taken in conjunction with the accompanying drawings, in which:

FIG. 1 illustrates an example of showing a predefined conventional normal DCI format;

FIGS. 4 to 6 illustrate embodiments of implementing a proposed technology through definition of a new IE in the disclosure;

FIG. 7 is a flowchart illustrating the flow of a DCI control method from a viewpoint of the BS apparatus according to an embodiment of the disclosure.

DETAILED DESCRIPTION OF THE EXEMPLARY EMBODIMENTS

Figure 2:
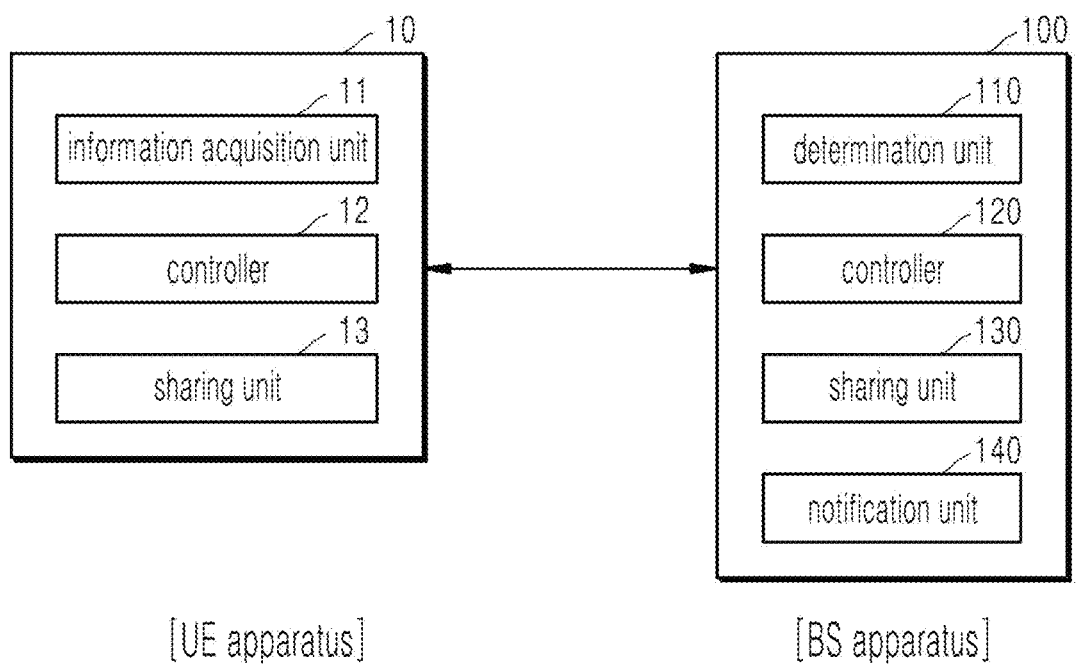
FIG. 2 illustrates configurations of a BS apparatus and a UE apparatus according to an embodiment of the disclosure.

The technical terms used in the present disclosure are only used to describe specific embodiments, and are not intended to limit the technical idea of the present disclosure. Unless defined otherwise in the present disclosure, the technical terms as used herein should be interpreted to have the same meaning as those commonly understood by a person skilled in the art to which the present disclosure pertains, and are not to be interpreted to have excessively comprehensive or excessively reduced meanings. Furthermore, when the technical terms as used herein are erroneous technical terms that fail to accurately express the technical idea of the present disclosure, they should be interpreted as alternative technical terms that can be correctly understood by a person skilled in the art. Furthermore, general terms as used herein should be interpreted to have the meanings defined in dictionaries or the contextual meanings in the relevant field of art, and are not to be interpreted to have excessively reduced meanings.

A singular expression used herein may include a plural expression unless they are definitely different in the context. As used herein, such an expression as "comprises" or "include" should not be interpreted to necessarily include all elements or all steps described in the specification, and should be interpreted to be allowed to exclude some of them or further include additional elements or steps.

The terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the present disclosure.

Hereinafter, embodiments of the present disclosure will be described in detail with reference to the accompanying drawings. Regardless of reference signs, the same or like elements are provided with the same or like reference signs in the drawings, and repetitive descriptions thereof will be omitted.

In describing the technology of the present disclosure, a detailed description of known functions or configurations incorporated herein will be omitted when it is determined that the description may make the subject matter of the disclosure unclear. Furthermore, it should be noted that the accompanying drawings are merely for the purpose of easy understanding of the technical idea of the present disclosure, and are not to be interpreted to limit the technical idea.

Hereinafter, embodiments of the present disclosure will be described with reference to the accompanying drawings.

The disclosure relates to a technology for controlling the size of downlink control information (DCI) and transmitting the DCI.

A physical downlink control channel (PDCCH) is a control channel and is used to transmit scheduling information for a physical downlink shared channel (PDSCH) or a scheduling grant for a physical uplink shared channel (PUSCH).

The information transmitted using the PDCCH may be generated and transmitted according to a downlink control information (DCI) format defined in the standard.

For the DCI, various types of formats are defined according to the use thereof.

For example, FIG. 1 illustrates DCI format 1_0 used to transmit PDSCH scheduling information in 5G.

Referring to FIG. 1, in the case of DCI format 1_0, various pieces of information such as modulation and coding scheme (MCS) information and a frequency/time location of a PDSCH are included.

The PDCCH used to transmit the DCI is an important channel containing control information, and thus stable transmission thereof is very important.

Accordingly, the DCI transmitted using the PDCCH is required to be designed to contain as much information as possible with a minimum size. This is because the DCI can be further preserved and transmitted using the PDCCH as the size of the DCI is smaller.

In the case of DCI format 1_0 illustrated in FIG. 1, the DCI contains various pieces of scheduling information for PDSCH transmission with only the number of bits corresponding to 28+alpha (16 bits based on 273 RBs).

To this end, there is a scheme for minimizing the DCI size through a method by which a BS generates a plurality of profiles in advance through an RRC message and transmits the same to a UE, and transmitting only indexes of the profiles through the DCI.

However, when there is much information to be transmitted to the UE through the DCI, the number of indexes that should be transmitted for each piece of the information increases, and thus the conventional scheme has a limitation in sufficiently meeting the purpose of transmitting as much information as possible with the minimized DCI size.

Accordingly, the disclosure proposes and implements a new type of DCI transmission technology capable of minimizing the DCI size and transmitting DCI containing as much information as possible beyond the limit of the conventional scheme.

Hereinafter, configurations of a BS apparatus and a UE apparatus for implementing the new type of DCI transmission technology proposed in the disclosure are described in detail with reference to FIG. 2.

Prior to the detailed description, the disclosure can be applied both 4G (LTE) and 5G (NR) and may be expanded and applied to 6G in the future. However, in the following description, features and various embodiments of the disclosure are described on the basis of the NR standard for convenience of description.

First, the configuration of the base station apparatus 100 according to an embodiment of the disclosure is described in detail with reference to FIG. 2.

As illustrated in FIG. 2, the BS apparatus 100 according to the embodiment of the disclosure may include a determination unit 110 and a controller 120.

Further, the BS apparatus 100 according to the embodiment of the disclosure may further include a sharing unit 130 and a notification unit 140.

In addition, the BS apparatus 100 according to the embodiment of the disclosure may further include a communication unit (not shown) performing communication with another BS of the same type of communication network (5G) and/or another BS of a different type of communication network (LTE) and a communication function with a UE 10.

All or at least some of the configurations of the BS apparatus 100 may be implemented in the form of a hardware module or a software module or implemented in the form of a combination of a hardware module and a software module.

The software module may be understood as, for example, an instruction executed by a processor for controlling calculations within the BS apparatus 100, and the instruction may have the form installed in a memory within the BS apparatus 100.

As a result, the BS apparatus 100 according to the embodiment of the disclosure embodies the new type of DCI transmission technology proposed in the disclosure through the above-described configuration.

Hereinafter, each element within the BS apparatus 100 of the disclosure is described in more detail.

The determination unit 110 performs a function of determining specific information for converting some information of all information of downlink control information (DCI) to be transmitted to the UE 10.

At this time, the specific information may be defined as a scheduling location of a physical downlink control channel (PDCCH) used for DCI transmission to the UE 10, that is, as location information of resources scheduled for transmitting the corresponding PDCCH.

That is, the determination unit 110 may determine location information (scheduling location) of the PDCCH for converting some information (bit value to be converted) of all information (bit stream) of the DCI to be transmitted to the UE 10.

The determination unit 110 may determine some information to be converted in the DCI to be transmitted to the UE 10 according to the predefined information location within the DCI.

The controller 120 may perform a function of omitting some information (bit value to be converted) in the DCI to be transmitted and then transmitting the DCI on the basis of the determined specific information, that is, the location information (scheduling location) of the PDCCH.

More specifically, PDCCH resources for the UE may be scheduled at various locations within a frequency axis.

For example, according to the NR standard, the PDCCH may be scheduled at locations of multiples of 6 RBs. When it is assumed that BWP BW=100 MHz and subcarrier-spacing=30 kHz (that is, 273 RBs), the number of locations of frequency resources at which the PDCCH can be scheduled is a maximum of 45.

If specific bits within the DCI can be associated with the location information (scheduling location) of the PDCCH used to transmit the corresponding DCI, the BS may transmit the DCI in which the specific bits are omitted using the PDCCH of the location information associated with the specific bits and the UE may acquire the specific bits of the received DCI from the PDCCH location information.

According to the disclosure, the DCI finally acquired in light of the UE 10 may be defined as shown in [Equation 1] below.

DCI=DCI bits received through PDCCH+Bits acquired from location information of PDCCH    [Equation 1]

That is, the disclosure embodies a new type of DCI transmission technology on the basis of the assumption that specific bits within the DCI are associated with location information of the PDCCH used to transmit the corresponding DCI.

Hereinafter, detailed description of the sharing unit 130 is first made.

The sharing unit 130 is associated with a configuration of associating specific bits within DCI with location information of the PDCCH used to transmit the corresponding DCI.

The sharing unit 130 performs a function of sharing information defining the conversion relation between information values (hereinafter, referred to as bit value) of some information to be converted within the DCI and location information (hereinafter, referred to as scheduling location) of the PDCCH with the UE 10.

In a detailed embodiment, the defined information shared between the BS apparatus 100 and the UE 10 by the sharing unit 130 may have different forms according to two embodiments below.

First, according to a first embodiment, the conversion relation between the bit value to be converted within the DCI and the scheduling location of the PDCCH may be identically predefined between the BS apparatus 100 and the UE 10.

In this case, the "defined information" shared between the BS apparatus 100 and the UE 10 by the sharing unit 130 is the identically predefined "conversion relation between the bit value to be converted within the DCI and the scheduling location of the PDCCH".

For example, the conversion relation between the bit value to be converted within the DCI and the scheduling location of the PDCCH according to [Equation 2] below may be predefined.

$$\text{Location to } DCI \text{ bits} = \frac{UE\text{'s } PDCCH \text{ Start } RB \text{ Offset}}{PDCCH \text{ } RB \text{ scheduling step size}} \# \text{ bits} = \left[ \log_2 \frac{\text{Number of Total } RBs}{PDCCH \text{ } RB \text{ scheduling step size}} \right] \quad \text{[Equation 2]}$$

In [Equation 2], location to DCI bits a bit value of some information within DCI to be converted into the PDCCH scheduling location, that is, a bit value to be converted.

Figure 3:
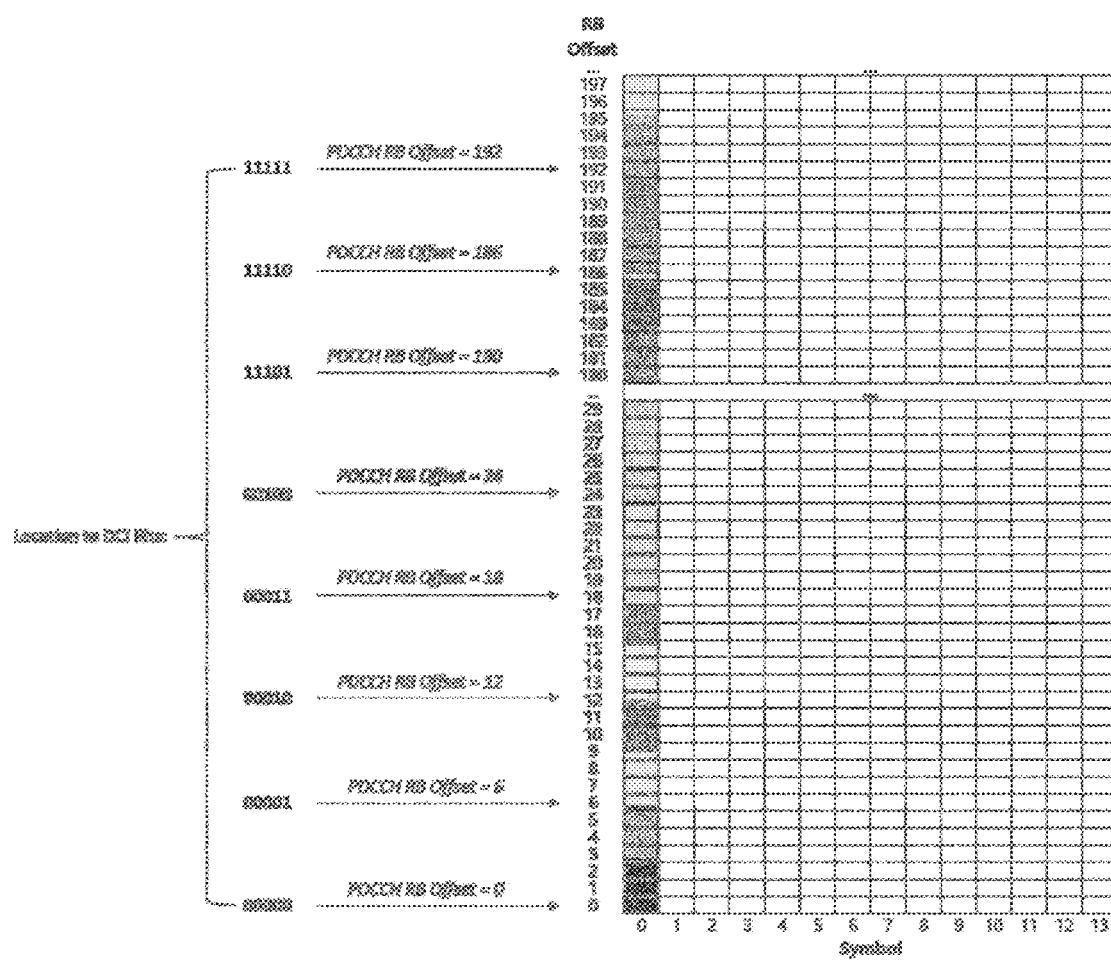
FIG. 3 illustrates an example showing a conversion relation between a bit value of DCI and location information of a PDCCH applied to the disclosure.

When it is assumed that Number of T☐ 摩tal RBs=273 RB and PDCCH RB scheduling step size=6 RB according to the NR standard in which the PDCCH can be scheduled at locations of multiples of 6 RBs, the bit value to be converted may be mapped to 00000 a start RB offset of the PDCCH is 0 RBs as the scheduling location of the PDCCH, the bit value may be mapped to 00001 when the RB offset is 6 RBs, the bit value may be mapped to 00010 when the RB offset is 12 RBs, the bit value may be mapped to 00011 when the RB offset is 18 RBs, and the bit value may be mapped to 11111 when the RB offset is 192 RBs as illustrated in FIG. 3.

In the first embodiment, the determination unit 110 may determine the scheduling location of the PDCCH according to the information value of some information, that is, the bit value to be converted on the basis of predefined information shared with the UE 10, that is, identically predefined information (for example, [Equation 2] with the UE 10.

As described above, the BS apparatus 100 (the determination unit 110) may predefine the information location within the DCI, thereby defining which bit value within the DCI is to be converted.

For example, the information location within the DCI indicating which bit value within the DCI is to be converted may be defined as 1) the last n bits, 2) the first n bits, or 3) bits from an $x^{th}$ bit.

The information location within the DCI may be selected and defined during the standardization process and identically defined between the BS apparatus 100 (the determination unit 110) and the UE 10 or may be selected by the BS apparatus 100 (the determination unit 110) and informed to the UE 10 through an RRC message, and thus identically defined between the BS apparatus 100 (the determination unit 110) and the UE 10.

When the information location within the DCI indicating the last 5 bits to be converted within the DCI is predefined, the determination unit 110 may determine the last 5 bits of the DCI to be transmitted to the UE 10 as the target to be converted and determine the scheduling location of the PDCCH according to a bit value of the 5 bits in the first embodiment. For example, when the bit value of the last 5 bits of DCI is 00001, the determination unit 110 may determine that the PDCCH Start RB Offset=6 RBs as the scheduling location of the PDCCH.

In a second embodiment, the BS apparatus 100 may transmit bit value information for each PDCCH start RB offset to the UE 10 through the RRC message to inform the UE of the same.

In this case, the "defined information" shared between the BS apparatus 100 and the UE 10 by the sharing unit 130 is "bit value information for each PDCCH start RB offset" transmitted to the UE 10.

For example, in the disclosure, a new IE for transmitting the "bit value information for each PDCCH start RB offset" may be defined in pdcch-Configuration Common within an RRC reconfiguration message.

The defined new IE may be referred to as a location-ToDciConversionInfo IE.

In this case, the sharing unit 130 may share the "bit value information for each PDCCH start RB offset" by transmitting the same to the UE 10 through the use of a new IE, that is, the locationToDciConversionInfo IE defined in pdcch-Configuration Common within the RRC reconfiguration message.

More specifically, referring to FIG. 4, a frequencyDomainResources IE is an IE defined in the 3GPP 5G standard and may short a frequency domain configuration of a control resource set (CORESET).

Each bit of the frequencyDomainResources IE corresponds to 6 RBs, and 1 indicates that it corresponds to the CORSET and 0 indicates that it does not correspond thereto. The PDCCH may be allocated only to an area allocated as the CORESET.

As illustrated in FIG. 4, the new IE proposed in the disclosure, that is, the locationToDciConversionInfo IE may be used to transmit the bit value (mapping) information for each PDCCH start RB offset. Here, each line separated by within the locationToDciConversionInfo IE may be mapped to the RB location defined as '1' in frequencyDomainResources.

According to the example of FIG. 4, a first bit value (00000) of locationToDciConversionInfo corresponds to RB Offset=0, and a second bit value (001011) corresponds to RB Offset=18 RB corresponding to a second '1' in frequencyDomainResources. In the case of RB offsets 6 and 12, frequencyDomainResources is '0', and thus PDCCH resources cannot be allocated, and accordingly, mapped information is not defined and omitted in locationToDciConversionInfo.

That is, as illustrated in FIG. 4, the sharing unit 130 may insert the bit value (mapping) information for each PDCCH start RB offset into the newly defined locationToDciConversionInfo IE into pdcch-Configuration Common within the RRC reconfiguration message and transmit the RRC reconfiguration message, so as to transfer and share the bit vale information to and with the UE 10.

In the second embodiment, the determination unit 110 may determine the scheduling location of the PDCCH according to the information value of some information, that is, the bit value to be converted on the basis of predefined information shared with the UE 10, that is, information (for example, see FIG. 4) transmitted to the UE 10 through the newly defined locationToDciConversionInfo IE.

At this time, the BS apparatus 100 (the determination unit 110) may also predefine the information location within DCI by performing selection and definition during the standardization process or notifying the UE 10 through the RRC message, so as to define which bit value within DCI is to be converted (the above description 1) to 3)).

When the information location within the DCI indicating the last n bits of the DCI to be converted is predefined, the determination unit 110 may determine the last n bits of the DCI to be transmitted to the UE 10 as the target to be converted and determine the scheduling location of the PDCCH according to a bit value of the last n bits in the second embodiment. For example, when the bit stream of the last n bits is 0001011, the determination unit 110 may determine that the PDCCH Start RB Offset=18 RBs as the scheduling location of the PDCCH.

Further, when the scheduling location of the PDCCH (for example, the start RB offset of the PDCCH) for converting some information within the DCI to be transmitted, that is, the bit value to be converted is determined by the determination unit 110, the controller 120 may omit the bit value to be converted in the DCI to be transmitted and then transmit the DCI through the PDCCH at the determined scheduling location.

Accordingly, the UE 10 of the disclosure may acquire the omitted specific bits (=the bit value to be converted) of the received DCI from the PDCCH location information, that is, the scheduling location detected during the process of receiving the DCI through the PDCCH and acquire DCI including all pieces of information as shown in [Equation 1] above using the specific bits.

Subsequently, the configuration of the UE apparatus 10 according to an embodiment of the disclosure is described with reference to FIG. 2.

As illustrated in FIG. 2, the UE apparatus 10 according to an embodiment of the disclosure may include an information acquisition unit 11 and a controller 120.

The UE apparatus 10 according to an embodiment of the disclosure may further include a sharing unit 13.

All or at least some of the elements of the UE apparatus 10 may be implemented in the form of a hardware module or a software module, or implemented in the form of a combination of a hardware module and a software module.

The software module may be understood as, for example, an instruction executed by a processor for controlling calculations within the UE apparatus 10, and the instruction may have the form installed in a memory within the UE apparatus 10.

As a result, the UE apparatus 10 according to an embodiment of the disclosure implements a new type of DCI transmission technology proposed in the disclosure through the above-described configuration.

Hereinafter, each element within the UE apparatus 10 according to the disclosure is described in more detail.

When receiving downlink control information (DCI), the information acquisition unit 11 may perform a function of acquiring some information omitted in the DCI from specific information detected during the process of receiving the DCI.

At this time, the specific information may be defined as a scheduling location of a physical downlink control channel (PDCCH) used for DCI transmission, that is, as location information of resources scheduled for transmitting the corresponding PDCCH.

That is, the information acquisition unit 11 may acquire some information (bit value to be converted) omitted in the received DCI from the location information (scheduling location) of the PDCCH used for transmitting the corresponding DCI.

The controller 12 may perform a function of acquiring DCI including all information before some information (the bit value to be converted) is omitted, on the basis of some information (the bit value to be converted) acquired by the information acquisition unit 11.

As described above, the disclosure implements the new type of DCI transmission technology on the basis of the assumption that specific bits (the bit value to be converted) within the DCI are associated with location information of the PDCCH used to transmit the corresponding DCI.

Hereinafter, detailed description of the sharing unit 13 is first made.

The sharing unit 13 is associated with a configuration of associating specific bits (the bit value to be converted) within DCI with location information of the PDCCH used to transmit the corresponding DCI.

The sharing unit 13 performs a function of sharing information defining the conversion relation between information values (hereinafter, referred to as a bit value) of some information to be converted within the DCI and location information (hereinafter, referred to as scheduling location) of the PDCCH with the BS 100.

Specifically, according to a first embodiment of the BS apparatus 100, the "defined information" shared between the BS 100 and the UE apparatus 10 by the sharing unit 13 may be the identically predefined "conversion relation between the bit value to be converted within the DCI and the scheduling location of the PDCCH".

In the first embodiment, the information acquisition unit 11 may acquire a bit value identified to follow the scheduling location of the PDCCH used for this DCI transmission as the information value of some information omitted in this DCI, that is, the bit value to be converted by using predefined information shared with the BS 100, that is, equally predefined information (for example, [Equation 2]) with the BS 100.

At this time, the BS apparatus 100 may predefine the information location within DCI by performing selection and definition during the standardization process or notifying the UE 10 through the RRC message as described above, so as to define which bit value within DCI is to be converted (the above description 1) to 3)).

When the information location is predefined within DCI having the last 5 bits of the DCI to be converted, the information acquisition unit 11 may acquire 00001 as the bit value to be converted, corresponding to the last 5 bits of the omitted DCI when the scheduling location of the PDCCH used for this DCI transmission is, for example, PDCCH start RB offset=6 RBs in the first embodiment.

According to a second embodiment of the BS apparatus 100, the "defined information" shared between the BS 100 and the UE apparatus 10 by the sharing unit 13 may be "bit value information for each PDCCH start RB offset" transmitted by the BS 100 through the RRC message.

In the second embodiment, the information acquisition unit 11 may acquire a bit value identified to follow the scheduling location of the PDCCH used for this DCI transmission as the information value of some information omitted in this DCI, that is, the bit value to be converted by using predefined information with the BS 100, that is, the information (for example, see FIG. 4) received from the BS 100 through the newly defined locationToDciConversionInfo IE.

At this time, the BS 100 may predefine the information location within DCI by performing selection and definition during the standardization process or notifying the UE 10 through the RRC message as described above, so as to define which bit value within DCI is to be converted (the above description 1) to 3)).

When the information location is predefined within DCI having the last n bits of the DCI to be converted, the information acquisition unit 11 may acquire 0001011 as the bit value to be converted, corresponding to the last n bits of the omitted DCI when the scheduling location of the PDCCH used for this DCI transmission is, for example, PDCCH start RB offset=18 RBs in the second embodiment.

As described above, according to the disclosure, the new type of DCI transmission technology capable of minimizing the size of DCI and transmitting the DCI containing as much information as possible is implemented through a scheme of converting some information (the bit value to be converted) of the DCI into location information (scheduling location) of the PDCCH to transmit the same.

Further, the embodiments of the disclosure describe the scheduling information of the frequency domain as the location information of the DPCCH, but it is only an embodiment.

That is, the scheme/method of converting some information with the DCI, that is, the bit value to be converted into the location information of the PDCCH according to the disclosure can use the scheduling location extending up to the time domain as well as the frequency domain as the location information of the PDCCH. For example, when the PDCCH is transmitted in one or more symbols, it is also possible to convert some information (the bit value to be converted) of the DCI into the frequency/time domain scheduling location of the PDCCH to transmit the same.

Meanwhile, applying the scheme/method of converting some information within the DCI, that is, the bit value to be converted into the location information of the PDCCH and transmitting the same may not be efficient or may be impossible.

For example, the case in which two or more UEs having the same information of DCI to be converted into the location information of the PDCCH exist within the same slot or the case in which a DCI bit stream, which cannot be converted through the location information of the PDCCH, should be transmitted (for example, even though 11101 should be converted into location information and transmitted, the location information of the PDCCH for the corresponding bit stream has not been defined) may corresponds to such a situation.

Accordingly, the disclosure further proposes a technology for allowing the UE to recognize whether the received DCI is transmitted after some information within the DCI is converted into location information of the PDDCH.

To this end, the BS apparatus 100 of the disclosure may further include a configuration of a notification unit 140.

The notification unit 140 performs a function of pre-transmitting information configuring whether to convert some information within DCI in units of location information (hereinafter, referred to as the scheduling location) of the PDCCH to the UE 10 or transmitting information indicating whether to convert some information within the DCI in units of DCI to the UE 10 to allow the UE 10 to selectively perform an operation of acquiring DCI including all pieces of information before some information with the DCI is omitted from the scheduling location of the PDCCH.

In an embodiment, the notification unit 140 may pre-transmit information for configuring whether to convert some information within DCI in units of scheduling locations of the PDCCH to the UE 10 and inform in advance the UE which may be defined as a new IE in the disclosure.

More specifically, as illustrated in FIG. 5, the disclosure may define a new IE, that is, frequencyLocationToDciInfo IE in order to use the same for transmitting information configuring whether to convert some information within DCI in units of scheduling locations of the PDCCH.

Each bit of the frequencyLocationToDciInfo IE indicates whether the location (information) of the corresponding PDCCH is associated with conversion of some information within DCI (correlation) in accordance with a CORESET of the frequencyDomainResources IE. '1' indicates they have the correlation, and '0' indicates they have no correlation.

That is, the notification unit 140 may insert information ('1' or '0') indicating whether the location (information) of each PDCCH is associated with conversion of some information within the DCI into the frequencyLocationToDciInfo IE newly defined in pdcch-Configuration Common within the RRC reconfiguration message and transmit the pdcch-Configuration Common to the UE 10 as illustrated in FIG. 5.

In this case, when the scheduling location of the PDCCH used for transmitting the DCI is a preset location indicating the target to be converted in some information within the DCI, the information acquisition unit 11 of the UE apparatus 10 of the disclosure may acquire some information omitted in the DCI from the scheduling location of the PDCCH used for transmitting the DCI.

That is, when the scheduling location of the PDCCH used for this DCI transmission is the preset location indicating the target to be converted in some information within the DCI, in other words, the location corresponding to '1' in information identified from the frequencyLocationToDciInfo IE of the RRC message, the information acquisition unit 11 may acquire the bit value, to be converted, omitted in this DCI from the scheduling location of the PDCCH.

Meanwhile, when the scheduling location of the PDCCH used for this DCI transmission corresponds to '0' in information identified from the frequencyLocationToDciInfo IE of the RRC message, the information acquisition unit 11 may not attempt acquisition of the bit value to be converted.

Further, when the frequencyLocationToDciInfo IE is newly defined and used, the locationToDciConversionInfo IE described with reference to FIG. 4 may be associated with frequencyLocationToDciInfo described with reference to FIG. 5 rather than frequencyDomainResources.

That is, as illustrated in FIG. 6, in the disclosure, the frequencyLocationToDciInfo IE and the locationToDciConversionInfo IE may be defined as the new IE, and an embodiment in which both frequencyLocationToDciInfo and locationToDciConversionInfo are used may be implemented.

The scheme according to the embodiment has an advantage in that there is no need to change DCI formats defined in the standard. However, the PDCCH resource location which is not associated with conversion of some information within DCI should be allocated, and thus the number of bits of the DCI which can be controlled is limited.

Meanwhile, according to another embodiment, the notification unit 140 may transmit information indicating whether to convert some information within DCI in units of DCI to the UE 10 through the following two schemes to inform the UE 10 of it.

A first scheme is a scheme of adding a specific field indicating whether some information of the corresponding DCI is converted to the DCI.

In this case, when some information (the bit value to be converted) within DCI is converted into location information (the scheduling location) of the PDCCH, the notification unit 140 may insert information indicating the same into the specific field within the corresponding DCI and transmit the same.

[Table 1] below shows an example in which the specific field "PDCCH location to DCI info conversion indicator" is added to DCI format 1_0.

TABLE 1

| Field (Item) | Bits |
|---|---|
| PDCCH location to DCI info conversion indicator | 1 |
| Identifier for DCI formats | 1 |
| Frequency domain resource assignment | Variable |
| Time domain resource assignment | 4 |
| VRB-to-PRB mapping | 1 |
| Modulation and coding scheme | 5 |
| New data indicator | 1 |
| Redundancy version | 2 |
| HARQ process number | 4 |
| Downlink assignment index | 2 |
| TPC command for scheduled PUCCH | 2 |
| PUCCH resource indicator | 3 |
| PDSCH-to-HARQ_feedback timing indicator | 3 |

In this case, when the specific field indicating that some information within DCI is converted is inserted into the DCI, the information acquisition unit 11 of the UE apparatus 10 may acquire some information omitted in the DCI from the scheduling location of the PDCCH used for DCI transmission.

That is, when the information (for example, 1) indicating that some formation within the DCI is converted is identified in the specific field within this DCI, the information acquisition unit 11 may acquire a bit value, to be converted, omitted in this DCI from the scheduling location of the PDCCH.

Meanwhile, when the information (for example, 0) indicating that some information with the DCI is not converted is identified in the specific field within this DCI, the information acquisition unit 11 may not attempt acquisition of the bit value to be converted.

This scheme has a disadvantage in that the number of DCI bits increases by 1, but the number of bits of the DCI which can be reduced therethrough is larger, and thus it is possible to minimize the size of DCI.

A second scheme is a scheme of newly defining and using a dedicated DCI format used when some information within DCI is converted.

In this case, when some information (the bit value to be converted) within DCI is converted into location information (the scheduling location) of the PDCCH, the notification unit 140 may use a dedicated DCI format.

In this case, when the DCI has a dedicated DCI format, the information acquisition unit 11 of the UE apparatus 10 may acquire some information omitted in the DCI from the scheduling location of the PDCCH used for DCI transmission.

That is, when this DCI has a dedicated DCI format, the information acquisition unit 11 may acquire a bit value, to be converted, omitted in this DCI from the scheduling location of the PDCCH.

Meanwhile, when this DCI does not have a dedicated DCI format, the information acquisition unit 11 does not attempt acquisition of the bit value to be converted.

As described above, according to various embodiments of the disclosure, the new type of DCI transmission technology capable of minimizing the size of DCI and transmitting the DCI containing as much information as possible is implemented through a scheme of converting some information (the bit value to be converted) of the DCI into location information (scheduling location) of the PDCCH to transmit the same.

According to the disclosure, since it is possible to minimize the DCI size and transmit the DCI containing as much information as possible, an effect of more conserving and stably transmitting PDCCH resources and an effect of standardizing and using bit resources saved through the minimization of the DCI size for another purpose.

Figure 8:
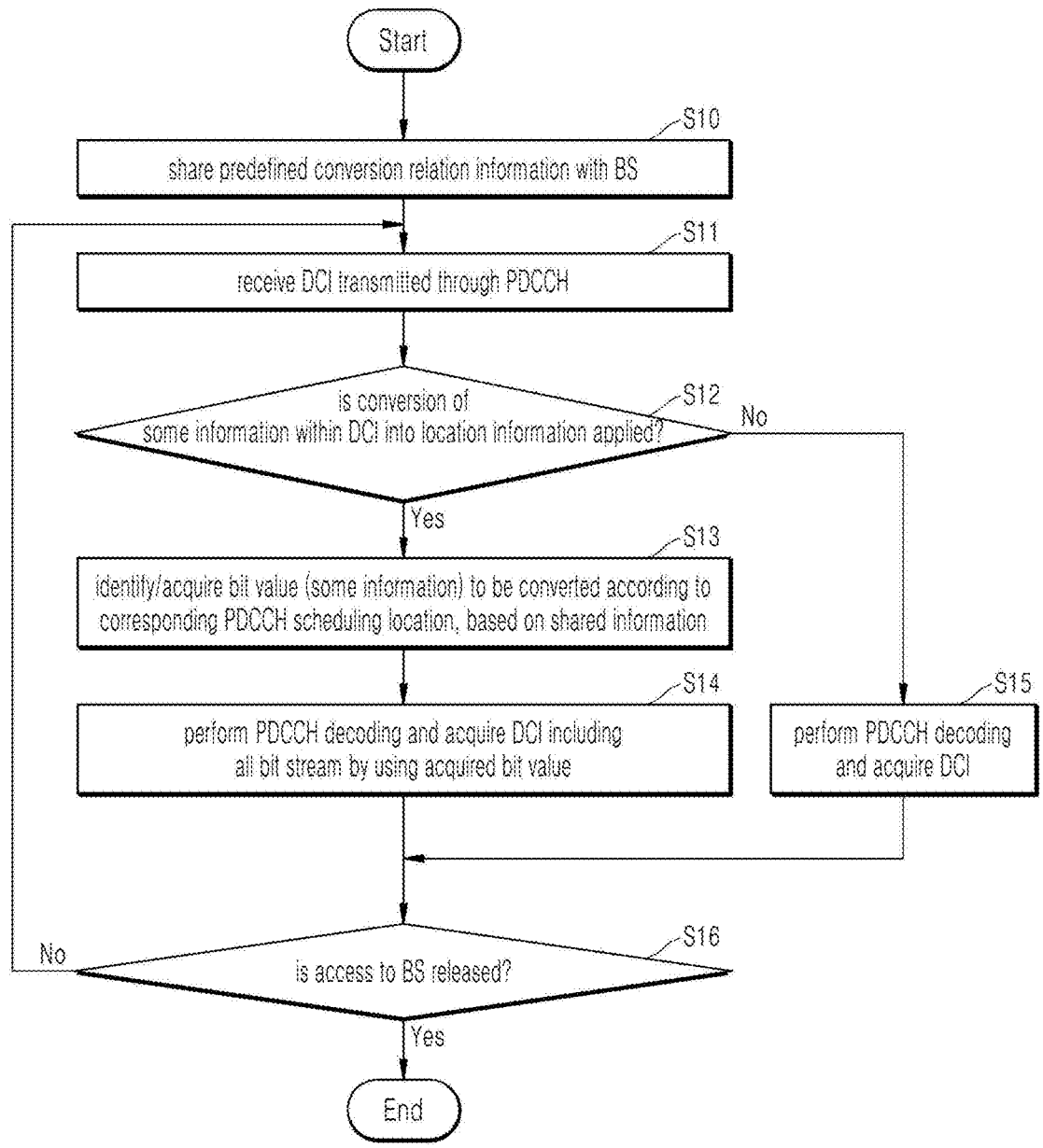
FIG. 8 is a flowchart illustrating the flow of a DCI control method from a viewpoint of the UE according to an embodiment of the disclosure.

Hereinafter, a DCI control method according to an embodiment of the disclosure is described with reference to FIGS. 7 to 8.

First, the DCI control method according to an embodiment of the disclosure is described from a viewpoint of the BS with reference to FIG. 7.

In the DCI control method according to an embodiment of the disclosure, the BS apparatus 100 shares information defining the conversion relation between an information value (hereinafter, referred to as a bit value) of some information to be converted within the DCI and location information (hereinafter, referred to as a scheduling location) of the PDCCH with the UE 10 in S100.

The sharing scheme may include a scheme (the first embodiment) of identically predefining the conversion relation between the bit value to be converted within the DCI and the scheduling location of the PDCCH and a scheme (the second embodiment) of transmitting bit value information for each PDCCH start RB offset to the UE 10 through the RRC message to inform the UE of the same.

In the DCI control method according to an embodiment of the disclosure, when DCI (for example, bit stream) to be transmitted to the UE 10 is generated in S110, the BS apparatus 100 may identify whether this DCI can be converted into location information of some information in S120.

For example, when it is determined that applying the method/scheme of converting some information within this DCI into location information of the PDCCH and transmitting the same is not efficient or is not possible, the BS apparatus 100 may identify that conversion is impossible (No of S120).

When it is identified that conversion is impossible (No of S120), the BS apparatus 100 transmits this DCI through the corresponding PDCCH after scheduling the PDCCH to be used for this DCI transmission in a method which is the same as the conventional method.

Meanwhile, in the DCI control method according to an embodiment of the disclosure, when it is identified that conversion is possible (Yes of S120), the BS apparatus 100 may determine the scheduling location of the PDCCH according to some information (the bit value to be converted) among all information (bit stream) of this DCI by using information shared with the UE 10 via operation S100 in S130.

Further, in the DCI control method according to an embodiment of the disclosure, in S140, the BS apparatus 100 may omit some information (the bit value to be converted) in this DCI to be transmitted and then transmit the DCI through the PDCCH at the scheduling location determined in S130.

In the DCI control method according to an embodiment of the disclosure, unless the UE 10 is turned off or is disconnected for the reason of movement (No of S160), the BS apparatus 100 may perform operation S110 and the following operation to perform the operation of the disclosure whenever the DCI is transmitted to the UE 10.

Accordingly, the UE 10 of the disclosure may acquire the omitted specific bits (=the bit value to be converted) of the received DCI from the PDCCH location information, that is, the scheduling location detected during the process of receiving the DCI through the PDCCH and acquire DCI including all pieces of information as shown in [Equation 1] above using the specific bits.

Subsequently, the DCI control method according to an embodiment of the disclosure is described from a viewpoint of the UE with reference to FIG. 8.

In the DCI control method according to an embodiment of the disclosure, the UE apparatus 10 shares information defining the conversion relation between an information value (hereinafter, referred to as a bit value) of some information to be converted within the DCI and location information (hereinafter, referred to as a scheduling location) of the PDCCH with the BS 100 in S10.

The sharing scheme may include a scheme (the first embodiment) of identically predefining the conversion relation between the bit value to be converted within the DCI and the scheduling location of the PDCCH and a scheme (the second embodiment) of receiving bit value information for each PDCCH start RB offset from the BS 100 through the RRC message.

In the DCI control method according to an embodiment of the disclosure, the UE apparatus 10 may receive the DCI transmitted through the PDCCH allocated to the UE itself in S11 and identify whether conversion of some information of this DCI into location information is applied in S12.

For example, the UE apparatus 10 may identify the conversion on the basis of information (for example, '1' or '0') indicating whether the location (information) of each PDCCH is associated with conversion of some information within the DCI in the frequencyLocationToDciInfo IE newly defined in the disclosure, relevant information within a specific field of this DCI, or whether this DCI follows a dedicated DCI format.

When it is identified that conversion is not applied (No of S12), the UE apparatus 10 acquires the DCI bits received through the PDCCH after decoding of the PDCCH in a method which is the same as the conventional method as final DCI in S15.

Meanwhile, in the DCI control method according to an embodiment of the disclosure, when it is identified that conversion is applied (Yes of S12), the UE apparatus 10 may acquire a specific bit value (=bit value to be converted) according to the scheduling location of the PDCCH used for transmitting the corresponding DCI, that is, some information omitted in the received DCI by using information shared with the BS 100 via operation S10 in S13.

Further, in the DCI control method according to an embodiment of the disclosure, the UE apparatus 10 may acquire final DCI including the entire bit stream as shown in [Equation 1] above by using the DCI bits acquired through decoding of the PDCCH and the bit value (=bit value to be converted) acquired in S13 in S14.

In the DCI control method according to an embodiment of the disclosure, unless access to the BS 100 is released for the reason of power off or movement (No of S16), the UE apparatus 10 may perform operation S10 and the following operation to perform the operation of the disclosure whenever the DCI is received.

As described above, according to various embodiments of the disclosure, the new type of DCI transmission technology capable of minimizing the size of DCI and transmitting the DCI containing as much information as possible is implemented through a scheme of converting some information (the bit value to be converted) of the DCI into location information (scheduling location) of the PDCCH to transmit the same.

According to the disclosure, since it is possible to minimize the DCI size and transmit the DCI containing as much information as possible, an effect of more conserving and stably transmitting PDCCH resources and an effect of standardizing and using bit resources saved through the minimization of the DCI size for another purpose.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a stand-alone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components.

The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

What is claimed is:
1. A BS apparatus comprising:
   a determination unit configured to determine specific information for converting a part of information of all information included in downlink control information (DCI); and
   a controller configured to delete the part of information in the DCI and transmit a DCI without the part of information to a UE based on the specific information, thereby the UE being able to acquire the part of information from the specific information detected during a process in which the UE receives the DCI without the part of information and acquire the DCI including the all information,
   wherein the specific information is a scheduling location of a physical downlink control channel (PDCCH) used for transmitting the DCI to the UE.
2. The BS apparatus of claim 1, further comprising:
   a sharing unit configured to share a conversion relation between an information value of the part of information and the scheduling location of the PDCCH with the UE, wherein the determination unit is configured to determine the scheduling location of the PDCCH according to the information value of the part of information using the conversion relation.

3. The BS apparatus of claim 2, wherein the controller is configured to transmit the DCI without the part of information through the PDCCH at the determined scheduling location.

4. The BS apparatus of claim 2, wherein the sharing unit is configured to share the conversion relation with the UE by transmitting the conversion relation to the UE using a new IE defined in pdcch-Configuration Common within an RRC reconfiguration message.

5. The BS apparatus of claim 1, further comprising:
   a notification unit configured to transmit information regarding whether to convert the part of information of the DCI for each of scheduling locations of the PDCCH to the UE or transmit information indicating whether to convert the part of information of the DCI for each DCI to the UE, thereby the UE being able to selectively perform an operation of acquiring the DCI including the all information from the scheduling location of the PDCCH.

6. The BS apparatus of claim 1, wherein the determination unit is configured to determine the part of information from the DCI according to a predefined information location within the DCI.

7. A UE apparatus comprising:
   an information acquisition unit configured to acquire a part of information deleted from downlink control information (DCI) based on specific information detected during a process of receiving the DCI without the part of information; and
   a controller configured to acquire the DCI including all information based on acquired some information,
   wherein the specific information is a scheduling location of a physical downlink control channel (PDCCH) used for transmitting the DCI to the UE.

8. The UE apparatus of claim 7, further comprising:
   a sharing unit configured to share a conversion relation between an information value of the part of information and the scheduling location of the PDCCH with the BS,
   wherein the information acquisition unit is configured to acquire an information value according to the scheduling location of the PDCCH used for transmitting the DCI as the information value of the part of information using the conversion relation.

9. The UE apparatus of claim 7, wherein the information acquisition unit is configured to, when the scheduling location of the PDCCH used for transmitting the DCI is a preset location indicating the part of information to be converted within the DCI, a specific field indicating conversion of the part of information within the DCI is included in the DCI, or the DCI has a dedicated DCI format used in the case of the part of information within the DCI being converted, acquire the part of information deleted in the DCI from the scheduling location of the PDCCH used for transmitting the DCI.

10. A method of controlling downlink control information (DCI) performed by a BS apparatus, the method comprising:
    determining specific information for converting a part of information of all information included in the DCI; and
    deleting the part of information in the DCI and transmit a DCI without the part of information to a UE based on the specific information, thereby the UE being able to obtain the part of information from the specific information detected during a process in which the UE receives the DCI without the part of information and acquire the DCI including the all information,
    wherein the specific information is a scheduling location of a physical downlink control channel (PDCCH) used for transmitting the DCI to the UE.

11. A method of controlling downlink control information (DCI) performed by a UE apparatus, the method comprising:
    acquiring a part of information deleted from the DCI based on specific information detected during a process of receiving the DCI without the part of information; and
    acquiring the DCI including all information based on acquired some information,
    wherein the specific information is a scheduling location of a physical downlink control channel (PDCCH) used for transmitting the DCI to the UE.

* * * * *